(No Model.) W. A. PEARSON. 2 Sheets—Sheet 1.
CAR WHEEL.
No. 449,823. Patented Apr. 7, 1891.
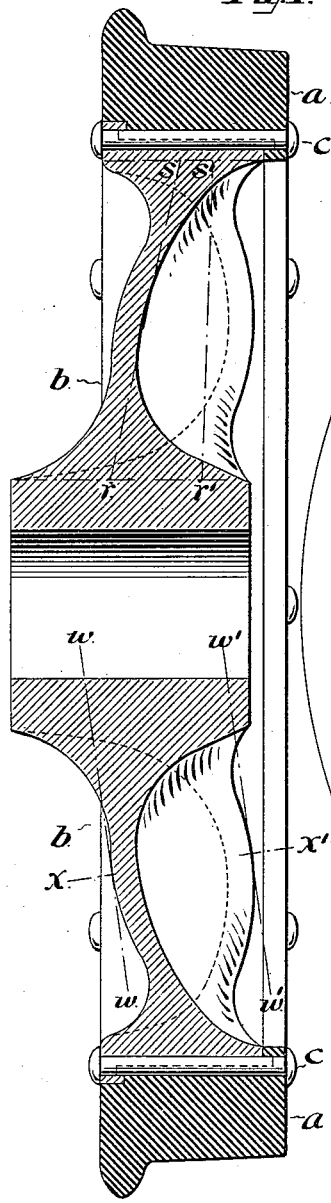
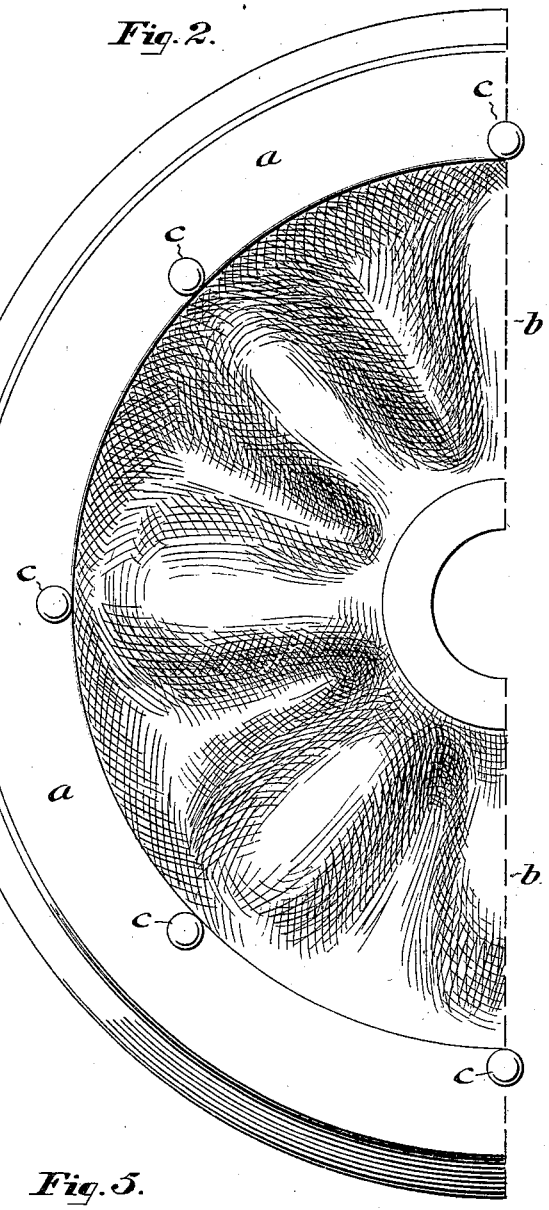
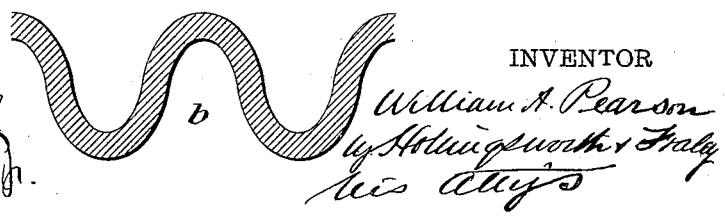
WITNESSES: INVENTOR (No Model.) 2 Sheets—Sheet 2.

W. A. PEARSON.
CAR WHEEL.

No. 449,823. Patented Apr. 7, 1891.

WITNESSES:
James H. Bell
Henry N. Paul Jr.

INVENTOR
William A. Pearson
by Hollingsworth & Fraley
his Attys

UNITED STATES PATENT OFFICE.

WILLIAM A. PEARSON, OF SCRANTON, PENNSYLVANIA, ASSIGNOR TO THE BOIES STEEL WHEEL COMPANY, OF PENNSYLVANIA.

CAR-WHEEL.

SPECIFICATION forming part of Letters Patent No. 449,823, dated April 7, 1891.

Application filed May 6, 1890. Serial No. 350,753. (No model.)

*To all whom it may concern:*

Be it known that I, WILLIAM A. PEARSON, of the city of Scranton, county of Lackawanna, and State of Pennsylvania, have invented certain new and useful Improvements in Car-Wheels, whereof the following is a specification, reference being made to the accompanying drawings, in which—

Figure 3:
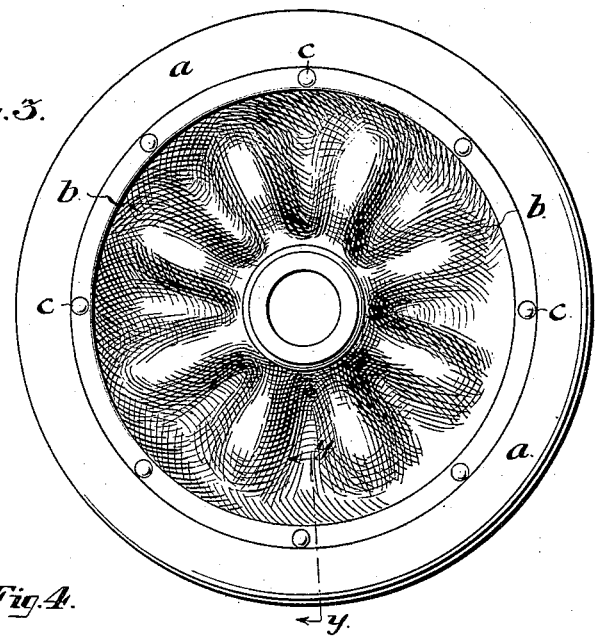
Figure 4:
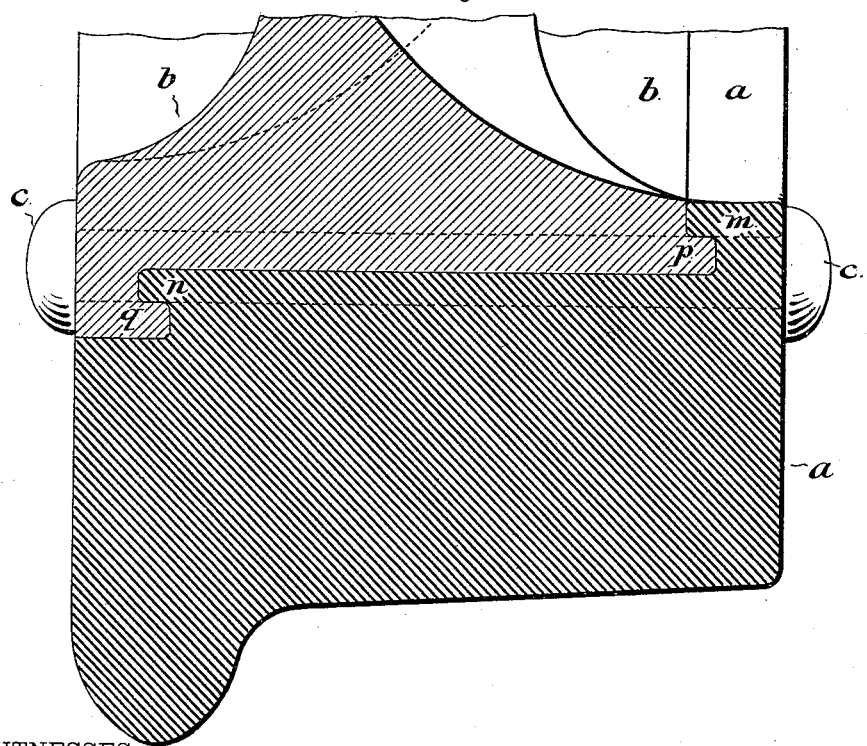

Figure 1 is a cross-section of the wheel through the center. Fig. 2 is a plan view of the outside of one-half of the wheel. Fig. 3 is a plan view of the inside of the wheel on a smaller scale. Fig. 4 represents on a large scale a section of the periphery through $y\ y$, Fig. 3, showing the means of joining the center to the tire, and Fig. 5 is a circular section through $x\ x'$, Fig. 1, represented as a plane section.

My invention consists in a composite car-wheel having a rolled steel tire and a die-forged steel center consisting of a single piece having corrugations of a peculiar form, and also in the method of joining the center to the tire.

In Fig. 1, $a$ represents the rolled-steel tire, provided with two small overhanging flanges running around its interior periphery, one being situated at the outside edge of the wheel and the other near the inside. These flanges are shown more clearly in Fig. 4, and lettered, respectively, $m$ and $n$.

Referring again to Fig. 1, $b$ represents the center. This is made from a casting or ingot, which is cast, forged, or rolled approximately in the shape of the complete center and then reheated and die-forged in a hydraulic press. In order to produce a corrugated steel forging of this shape from a single piece of metal great pressure is required, and the peculiar form of hydraulic press which I use for this purpose forms the subject-matter of another application for Letters Patent about to be filed by me. After having been forged in the manner described in that application the hole for the axle is punched out while the forging still remains within the press, or it may be afterward bored out. The rim of the center is then turned into shape. The rim contains upon its periphery two overhanging flanges corresponding to those upon the inside of the tire, and shown upon a large scale in Fig. 4 at $p$ and $q$. The proper distribution of the strain between the hub and rim of the center is secured by deep radial corrugations extending all the way from the hub to the rim. They are shown in the plan view in Figs. 2 and 3, and their extreme limits are indicated by the lines of the section in Fig. 1. It will be seen that the distance from the top of the inside extreme of the corrugation to the top of the outside extreme of the corrugation is greatest at a point about half-way between the hub and the rim. This appears most clearly by following the dotted parallel lines $w\ w\ w'\ w'$, drawn on the lower half of Fig. 1. The interior corrugation swells gradually until it touches the line $w\ w$ at the point $x$, and then again retreats. The exterior corrugation also swells gradually until it touches the line $w'\ w'$ at the point $x'$. This may be more concisely stated by saying that the amount of radial corrugation is greater at the point on the section indicated by the line $x\ x'$ than at any other part. The distribution of the metal in a wheel of this shape is an important feature. The sections of the extreme limit of the corrugation both ways are shown in Fig. 1, and the points $r\ r'$ indicate, respectively, the centers of gravity of the hub half of the inside and outside sections. In like manner $s$ and $s'$ indicate the centers of gravity of the tire-half of the sections. It will be seen that $r$ and $r'$ are farther apart than $s$ and $s'$. The purpose of this corrugation is fourfold: First, as above stated, it distributes the strain between the hub and the rim across the width of the wheel both at the hub and periphery; secondly, the bulging rim of both the inside and outside edge of the corrugation operates upon the principle of a double-plated dished wheel and admits of the necessary expansion and contraction of the wheel due to the pressure of the tire. It must be noted that when the wheel is compressed the points $x\ x'$ become more distant from each other, which does not necessitate any violent strain upon the wheel in any direction, because between these points there are no straight lines, but only S-shaped curves; thirdly, owing to the corrugations being greatest on the line $x\,x'$ the base of support to the weight carried by the wheel is extended toward the ends of the hub to the greatest practicable distance, and the maximum yielding strength is secured with a minimum of metal; fourthly, the curves produced by corrugations of this sort are best calculated to withstand the lateral thrust of the wheel as it runs around a curve.

The tire is made slightly smaller than the center in inside diameter and is shrunk upon it. It may, however, be simply forced upon it without shrinking. The flanges $m$ and $n$ interlock with the corresponding flanges $p$ and $q$, and at intervals around the wheel-bolts $c\ c$ are passed and fastened either by a nut or by riveting. These bolts are so placed that one-half of each passes through the inner periphery of the tire and one-half through the outer periphery of the rim. The advantage of this position of the bolt, in combination with the two sets of overhanging flanges, is that every possible movement of the tire relative to the center is absolutely prevented, while at the same time the tire may be removed by simply removing the heads of the bolts.

The strongest tendency of a tire is to slip to the inside of the wheel as it passes around a curve. This is effectually prevented by the interlocking flanges. Slipping in the opposite direction is prevented by the bolts, which are sufficiently strong for the purpose, as the strain in this direction is very slight. Any circular slipping of the tire upon the center when the brakes are applied is prevented by the bolts passing partly through the center and partly through the tire, and, lastly, in case of fracture of the tire its fragments are held from being thrown off centrifugally by the overhanging shoulders of the flanges $p$ and $q$, retained in position by the bolts. In no other composite wheels have these four dangers been effectually guarded against, except those in which the connection between the tire and the center is such that the former can only be removed by sawing it in two.

I am aware that, broadly speaking, a die-forged steel car-wheel is not new. My invention, however, consists in a corrugated die-forged steel center struck from a single casting or ingot.

Having thus described my invention, what I claim, and desire to secure by Letters Patent, is—

1. A car-wheel having corrugated center with radial corrugations which increase in amount of corrugation to a point approximately midway between the hub and the periphery and then again decrease, substantially as described.

2. A car-wheel having a die-forged corrugated center with radial corrugations, the inside and outside extremes of which present in radial section curves concave toward each other, substantially as described.

3. A car-wheel having a die-forged corrugated center with radial corrugations, the inside and outside extremes of which present radial sections such that the physical centers of the hub halves of these sections are farther apart than the physical centers of the tire halves, substantially as described.

4. In a composite car-wheel, the combination of a tire $a$, having around its inner periphery the overhanging flanges $m\ n$, and the center $b$, having around its outer periphery corresponding overhanging flanges $p\ q$, and the bolts $c\ c$ passing through and between the center and the tire approximately one-half their width, being embedded in each, substantially as described.

WILLIAM A. PEARSON.

Witnesses:
JAS. H. TORREY,
L. M. HORTON.